United States Patent

[11] 3,573,483

| [72] | Inventor | Gregory C. White<br>Evansville, Ind. |
|---|---|---|
| [21] | Appl. No. | 821,241 |
| [22] | Filed | May 2, 1969 |
| [45] | Patented | Apr. 6, 1971 |
| [73] | Assignee | Essex International, Inc.,<br>Fort Wayne, Ind. |

[54] POWER SUPPLY CONTROL APPARATUS
3 Claims, 2 Drawing Figs.

[52] U.S. Cl. ................................................. 307/66
[51] Int. Cl. ................................................. H02j 7/00
[50] Field of Search........................................ 307/66, 64,
85, 86, 87, 82, 84, 57, 43, 46, 48, 49, 50, 51;
320/2, 29, 30

[56] References Cited
UNITED STATES PATENTS
3,049,623   8/1962   Du Vall ........................ 307/66

3,179,871   4/1965   Bagno ........................... 307/66UX
3,387,141   6/1968   Howald ......................... 307/66X
3,480,791   11/1969  Lesher........................... 307/66

Primary Examiner—Robert K. Schaefer
Assistant Examiner—H. J. Hohauser
Attorney—Bair, Freeman & Molinare ABSTRACT: In the event a primary voltage source fails, an auxiliary voltage source may be provided to a load by a battery and an isolating transistor that conducts current to the load from the battery. The isolating transistor is controlled by a first control circuit that causes the transistor to conduct if the voltage produced by the primary voltage source decreases below a predetermined value. The isolating transistor is also controlled by a second control circuit that returns the isolating transistor to its nonconductive state if the voltage produced by the battery decreases below a predetermined value. Both the first and second control circuits preferably comprise a Zener diode and a resistor.

INVENTOR.
GREGORY C. WHITE
BY
Bair, Freeman & Molinare
ATTORNEYS 3,573,483

1

POWER SUPPLY CONTROL APPARATUS

BACKGROUND OF THE INVENTION

This invention relates to power supplies, and is more specifically directed to apparatus for controlling an auxiliary power supply that becomes operative in the event a primary power supply fails.

Although electrical power failures have become less frequent in recent years, there is still a need to supply certain types of electrical apparatus with an auxiliary power supply, such as a nickel cadmium cell battery, for use in the event that service from a primary voltage source is temporarily interrupted. In order to operate effectively, the battery must be automatically switched into operation when the voltage of the primary voltage source decreases below a predetermined value. Moreover, in order to prevent damage to the battery, the current flow between the battery and load must be interrupted when the battery has become substantially discharged.

Although devices of the foregoing type have been available in the past, each has exhibited deficiencies that have limited its usefulness. Basically, prior art power supply control devices have relied on relays in order to switch a battery into operation due to failure of the primary voltage source. Such relays are relatively expensive, bulky, and do not provide precise switching at a predetermined voltage level. Moreover, their operation tends to be slow so that a uniform voltage is not maintained on the load during the switching operation. The relays are generally operated from the battery so that they remain effective in the event of a failure in the primary voltage supply. Such relays, of course, draw current from the battery and thereby shorten its useful operating period.

The connection of relays in the manner described tends to completely discharge the battery if it is used over a sustained period of time. Those skilled in the art will appreciate that the complete discharge of a normal nickel cadmium battery may be quite harmful. Such a battery comprises the series combination of several cells which may not have the same initial capacity. When the cell with the lowest capacity is fully discharged, the other cells in the battery reverse bias the discharged cell, and thereby may destroy it. Although it is possible to avoid this effect by using a complex, double winding relay that disconnects the relay coil from the battery, such a relay is relatively expensive and therefore is not economically feasible for many applications.

Aside from the foregoing disadvantages, relays must be periodically inspected and cleaned or must be hermetically sealed and lubricated. Either alternative necessarily results in a relatively expensive and bulky piece of switching equipment.

SUMMARY OF THE INVENTION

Applicant has discovered that an auxiliary voltage source, such as a battery, may be connected to a load in the event of a failure of a primary voltage source by providing an isolating device that normally blocks the flow of current between the auxiliary voltage source and the load. The isolating device is controlled by a first control circuit that preferably provides a means of biasing a variable resistance device having a conductive state and a nonconductive state. If the voltage produced by the primary voltage source decreases below a predetermined value, the first control circuit causes the variable resistance device to be switched from a first to a second of its states. In a preferred embodiment of the invention the isolating device is biased into the conducting state in response to the switching of the variable resistance device, allowing current to flow from the battery to the load, thereby maintaining a proper voltage across the load.

If the voltage of the battery decreases to a predetermined value due to sustained usage thereof, a second control circuit connected to the battery rebiases the isolating device so that it is switched to its nonconducting state and the isolating device again blocks the flow of current from the battery to the load, thereby preventing the battery from completely discharging and being damaged.

2

By using apparatus of the above-described type, the voltage at which the battery is connected and disconnected with respect to the load is precisely determined, and switching occurs at an extremely fast rate so that uniform voltage is consistently applied to the load. Moreover, the apparatus is relatively inexpensive and requires no periodic inspection or cleaning.

If the present invention is used with a primary voltage source comprising an AC power source, a rectifier and a regulator, the battery may be charged from the output of the rectifier in order to maintain the battery at a voltage sufficiently large to simulate the voltage produced at the output of the regulator. As a result, power may be supplied from the battery at the same voltage normally supplied to the load from the regulator. Moreover, the first control circuit may be connected to the output of the regulator so that failure of either the AC power source or the regulator is immediately detected. These features result in a control circuit that is more accurate and reliable than prior art devices, and at the same time, is less expensive to buy and operate.

DESCRIPTION OF THE DRAWINGS

These and other features and advantages of the present invention will hereinafter appear for purposes of illustration, but not of limitation, in connection with the accompanying drawings, wherein.

DESCRIPTION OF THE PREFERRED EMBODIMENT

Figure 1:
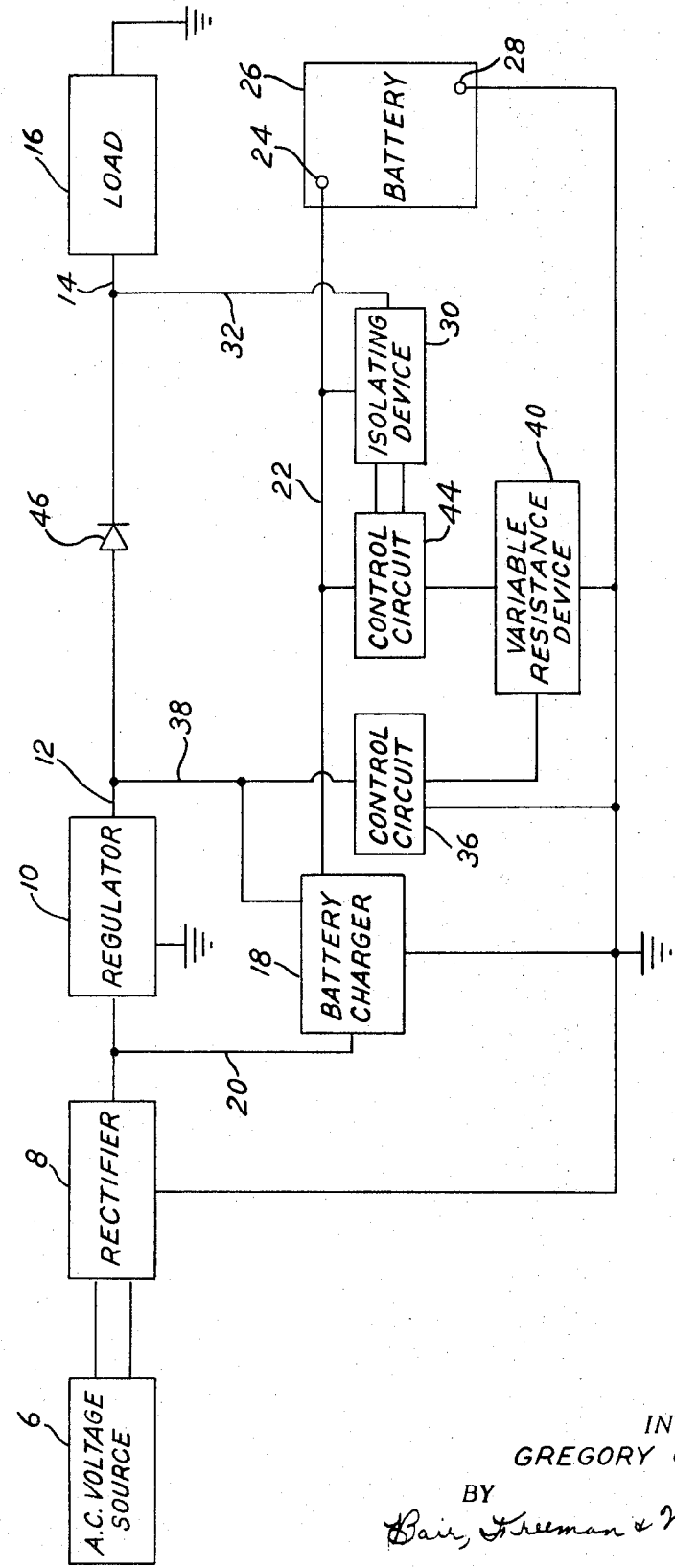
FIG. 1 is a schematic, block diagram representation of a preferred form of the present invention used in connection with exemplary primary and auxiliary voltage sources.

Referring to FIG. 1, the preferred embodiment of the present invention is shown in connection with a primary voltage source comprising an AC voltage source 6, a rectifier 8, and a regulator 10. Rectifier 8 converts the alternating current received from source 6 to direct current that is supplied to regulator 10. Regulator 10 filters the periodic alternating components of current received from rectifier 8 and controls the flow of current so that a predetermined voltage is maintained on conductor 12. Regulator 10 is joined through conductors 12 and 14 to a load 16 that is designed to operate on the predetermined DC voltage supplied by the regulator.

The preferred embodiment of the invention is also shown in connection with 12.5 volt nickel cadmium storage battery 26 that comprises an auxiliary voltage source.

Still referring to FIG. 1, a preferred form of the present invention basically comprises a battery charger 18 connected to the output of rectifier 8 over a conductor 20. The battery charger controls the voltage applied through a conductor 22 to a positive terminal 24 of battery 26. The battery also has a negative terminal 28 that is grounded. By connecting the battery charger to the output of the rectifier, rather than the output of the regulator, the battery may be charged to a voltage slightly higher than the voltage normally supplied to the load through regulator 10. As a result, if any component in the primary voltage source fails, the battery may be connected to supply the load without substantially disrupting the voltage thereon.

The battery is connected over conductor 22, an isolating device 30, and a conductor 32 to load 16. When voltage source 6, rectifier 8, and regulator 10 are operating in a normal manner, load 16 is supplied with a positive 12.0 volt DC signal, and the isolating device effectively blocks the current flow from the battery to the load.

Isolating device 30 is operated by a control circuit 36 that is connected to the output of regulator 10 over a conductor 38. Control circuit 36 supplies a bias voltage for a variable resistance device 40. Another bias voltage is supplied to the variable resistance device by a control circuit 44 that is connected to the positive terminal of the battery over conductor 22. If any component of the primary voltage source fails so that the voltage carried on conductor 12 decreases below a predetermined value, control circuit 36 causes variable resistance device 40 to switch from its nonconductive to its conductive state. As a result, current is drawn through control circuit 44, and isolating device 30 is operated so that it allows current to flow from the battery to the load. Accordingly, control circuit 36 and variable resistance device 40 provide a means of switching the isolating device when the voltage carried on conductor 12 decreases below a predetermined value. The foregoing switching operation takes place almost instantaneously so that the load is supplied with a virtually uniform voltage at conductor 14 even though the primary source of voltage fails.

Diode 46 is connected between conductors 12 and 14 in order to prevent the voltage supplied by the battery from energizing control circuit 36, thereby giving a false indication that the regulator is supplying an appropriate voltage signal.

If the battery supplies the load for a sustained period of time, the battery voltage begins to decline as its cells are depleted. As previously mentioned, the complete discharge of nickel cadmium cell battery is dangerous since one of the cells may be reverse biased and thereby seriously damaged. Accordingly, when the battery has discharged to a predetermined voltage, current ceases to flow through control circuit 44, and isolating device 30 is operated so as to block the flow of current from the battery to the load. Accordingly, the battery is maintained in a partially charged state that prolongs its lifetime.

Figure 2:
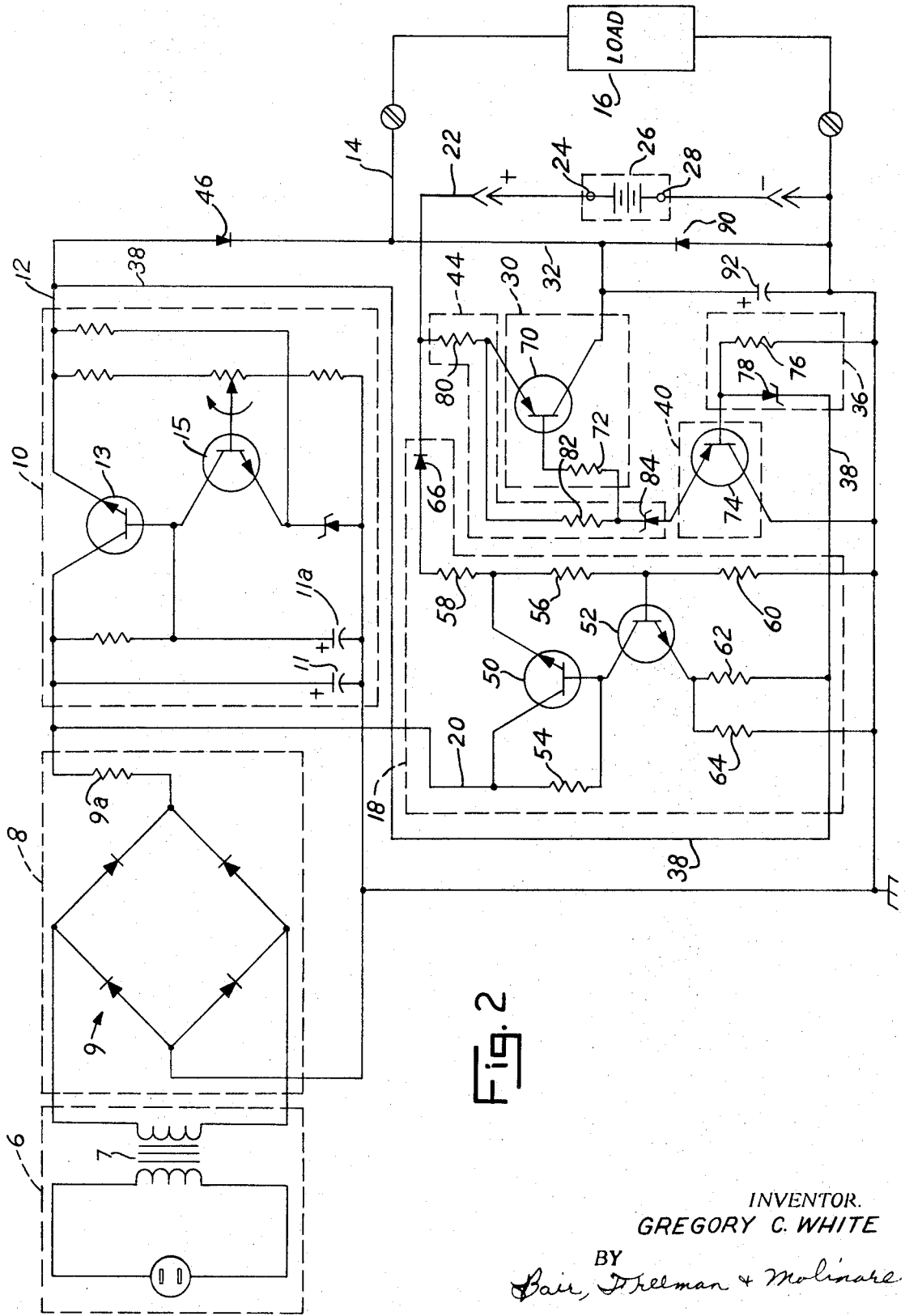
FIG. 2 is a detailed schematic drawing of the apparatus shown in FIG. 1.

The apparatus described in FIG. 1 is shown in more detail in FIG. 2. As shown in FIG. 2, AC voltage source 6 comprises a source of 117 volt, 60 cycle AC current and a stepdown transformer 7. Rectifier 8 consists of a full-wave rectifier 9 that employs four diodes and an output resistor 9a. Regulator 10 consists of filtering capacitors 11 and 11a, a series regulating transistor 13, and a control transistor 15, all of which operate in a well-known manner.

The components of the preferred embodiment shown in FIG. 1 are also illustrated in more detail in FIG. 2. More specifically, battery charger 18 comprises a transistor 50 having its collector-emitter junction connected in series with the battery, and a control transistor 52 that determines the amount of bias voltage applied to transistor 50. Battery charger 18 also comprises bias resistors 54, 56, 58, 60, 62, and 64, and a blocking diode 66 that prevents the flow of current from the battery to transistor 50.

When AC voltage source 6, rectifier 8, and regulator 10 are operating in a normal manner, conductor 20 is maintained at a relatively high voltage so that transistor 50 may conduct current to the battery if enabled by transistor 52. Normally, a 12.5 volt signal is carried over conductor 38 so that the emitter of transistor 52 is maintained at a relatively high voltage. If the voltage across the battery is relatively low, the base of transistor 52 is also maintained at a relatively low voltage so that transistor 52 is held in its nonconductive state. As a result, the voltage at the base of transistor 50 increases so that transistor 50 conducts additional current to the battery. When the battery has been charged in the foregoing manner to approximately 13 volts, the voltage at the base of transistor 52 is increased so that it conducts a considerable amount of current. As a result, the voltage at the base of transistor 50 decreases so that the current conducted to the battery is limited to a small amount.

Still referring to FIG. 2, isolating device 30 comprises a transistor 70 and a bias resistor 72 connected in the base-emitter circuit of transistor 70.

Variable resistance device 40 comprises a transistor 74. Control circuit 36 comprises a 9.1 volt Zener diode 78 that is connected between conductor 38 and the base of transistor 70 74, and a bias resistor 76 that is connected between the base of transistor 74 and the ground potential.

Control circuit 44 comprises a resistor 80 connected between conductor 22 and the emitter of transistor 70. The control circuit also comprises a resistor 82 connected between the emitter of transistor 70 and the base circuit thereof, and a 10 volt Zener diode 84 that is connected to the emitter of transistor 74.

A diode 90 and a capacitor 92 are connected between ground potential and conductor 32 in order to limit switching transients produced by transistor 70 to a minimum.

The apparatus described in FIG. 2 operates as follows. When voltage source 6, rectifier 8, and regulator 10 are operating in a normal manner, a 12.5 volt signal is applied through diode 46 to load 16. In this mode of operation, the base of transistor 74 is biased at approximately 3.4 volts due to the current flowing through diode 78 and resistor 76. The emitter of transistor 74 is biased at a maximum of 3.0 volts due to the operation of resistors 80, 82, and Zener diode 84. As a result, transistor 74 is in its nonconductive state so that virtually no current flows through resistor 82. Since there is virtually no voltage drop across resistor 82, the base and emitter of transistor 70 are at substantially the same voltage so that transistor 70 is in its nonconductive state. As a result, transistor 70 effectively blocks the flow of current from battery 26 to load 16.

When the voltage produced by regulator 10 decreases below about 11.5 volts, the base of transistor 74 is rebiased at about 2.4 volts due to the flow of current through Zener diode 78 and resistor 76. Since the emitter of transistor 74 is biased at about 3.0 volts, the transistor is rapidly switched to its conductive state so that a small amount of current flows from conductor 22 through resistors 80, 82, Zener diode 84, and transistor 74 to ground potential. The resulting voltage drop across resistor 82 forward biases the emitter-base junction of transistor 70 so that the transistor is switched to its conductive state. Battery 26 is then operatively connected to the load through resistor 80 and the emitter-collector junction of transistor 70. As a result, the voltage at conductor 14 is maintained at about 12.0—13.0 volts even though the primary voltage source has failed. In this mode of operation, diode 46 is reverse biased so that the voltage provided by the battery does not give a false indication that regulator 10 is producing an appropriate voltage. Moreover, resistor 80 limits the current flow through transistor 70 if the load is short-circuited.

When the voltage produced by the battery decreases below about 10.5 volts, there is insufficient potential to maintain 10 volts across Zener diode 84 so that current through resistors 80, 82 and Zener diode 84 is reduced to zero. The resultant loss of voltage across resistor 82 causes transistor 70 to be returned to its nonconductive state in the manner described above. As a result, transistor 70 blocks the flow of current from battery 26 to load 16 so that additional discharge of the battery is substantially prevented.

The above-described apparatus provides very rapid switching action that is controlled by relatively inexpensive Zener diodes. The use of this apparatus results in a power source control circuit that is more accurate, reliable, and inexpensive than the analogous prior art devices employing relays.

Those skilled in the art will appreciate that the apparatus described herein is merely exemplary of the preferred practice of the invention and that changes in the structure and the value of components described herein may be effected without departing from the spirit and scope of the invention.

I claim:

1. Apparatus for controlling the connection of an auxiliary voltage source to a load in the event of failure of a primary voltage source that normally supplies the load, said apparatus comprising in combination:

variable resistance semiconductor means having a conductive state and a nonconductive state;

a first voltage reference diode connected between the primary voltage source and the variable resistance semiconductor means for causing the variable resistance semiconductor means to switch from a first to a second of its states in the event that the voltage produced by the primary voltage source decreases below a predetermined value;

isolating semiconductor means responsive to the variable resistance semiconductor means for operatively disconnecting the auxiliary voltage source from the load when the variable resistance semiconductor means is in the first of its states and for operatively connecting the auxiliary voltage source to the load in response to the switching of said variable resistance semiconductor means to the second of its states; and a second voltage reference diode connected between said auxiliary voltage source and said variable resistance semiconductor means for causing said variable resistance semiconductor means to return to the first of its states when the voltage produced by the auxiliary voltage source decreases below a second predetermined voltage so that the isolating semiconductor means operatively disconnects said auxiliary voltage source from said load.

2. Apparatus, as claimed in claim 1, wherein said variable resistance semiconductor means comprises a transistor including a base electrode connected to said first voltage reference diode and including an emitter electrode connected to said second voltage reference diode.

3. Apparatus, as claimed in claim 2, wherein said isolating semiconductor means comprises a transistor having a base electrode connected through a resistor to the cathode of said second voltage reference diode, having an emitter electrode connected through a resistor to said cathode, and having a collector-emitter junction connected in series between the primary and auxiliary voltage sources.